(12) United States Patent
Wetzel et al.

(10) Patent No.: US 6,509,417 B1
(45) Date of Patent: Jan. 21, 2003

(54) COATING OF FATTY ACID-MODIFIED GLYCIDYL COPOLYMER, OH POLYMER AND OPTIONAL ANHYDRIDE POLYMER

(75) Inventors: Wylie H. Wetzel, Brookfield, WI (US); William G. O'Dell, Lawson, MO (US)

(73) Assignee: Lilly Industries, Inc., Indianapolis, IN (US)

(*) Notice: Subject to any disclaimer, the term of this patent is extended or adjusted under 35 U.S.C. 154(b) by 94 days.

(21) Appl. No.: 09/702,487

(22) Filed: Oct. 31, 2000

(51) Int. Cl.[7] .................. C08L 33/14; C08L 63/10; C08L 67/02; C08L 71/02; C08L 75/04

(52) U.S. Cl. .................. 525/208; 525/108; 525/111; 525/117; 525/118; 525/125; 525/131; 525/166; 525/176; 525/207; 525/404; 525/407; 525/438; 525/454

(58) Field of Search ................. 525/208, 108, 525/111, 117, 118, 125, 131, 166, 176, 207, 404, 407, 438, 454

(56) References Cited

U.S. PATENT DOCUMENTS

| | | |
|---|---|---|
| 3,136,736 A | 6/1964 | Washburne et al. |
| 4,129,537 A * | 12/1978 | Dhein et al. |
| 4,280,938 A * | 7/1981 | Strazik et al. ............ 428/413 |
| 4,614,683 A | 9/1986 | Barsotti ................. 524/539 |
| 4,681,811 A | 7/1987 | Simpson et al. ........... 528/112 |
| 4,732,791 A | 3/1988 | Blackburn et al. ......... 428/413 |
| 4,755,581 A | 7/1988 | Blackburn et al. ........... 528/93 |
| 4,870,141 A | 9/1989 | Kordomenos .............. 525/514 |
| 4,975,474 A | 12/1990 | Barsotti et al. ............ 523/400 |
| 5,057,555 A | 10/1991 | White et al. ............... 523/400 |
| 5,106,924 A | 4/1992 | Smith et al. .............. 525/530 |
| 5,270,362 A | 12/1993 | Palmer ...................... 524/81 |
| 5,977,255 A | 11/1999 | Li et al. .................... 525/102 |
| 6,037,416 A | 3/2000 | Iwamoto et al. ........... 525/207 |

FOREIGN PATENT DOCUMENTS

| | | |
|---|---|---|
| EP | 0 123 793 A1 | 1/1984 |
| EP | 0 123 793 B1 | 1/1984 |
| GB | 767476 * | 2/1957 |
| GB | 793776 * | 4/1958 |
| GB | 994881 | 8/1961 |
| JP | 59-100102 A * | 6/1984 |
| JP | 60-250072 A * | 12/1985 |

* cited by examiner

*Primary Examiner*—Robert E. L. Sellers
(74) *Attorney, Agent, or Firm*—Barnes & Thornburg

(57) ABSTRACT

A multi-component coating composition having a hard, glossy, and tack-free finish is described. The coating composition comprises a fatty acid modified glycidyl-containing component and a hydroxy-functional polymer. The coating composition can be used to originally finish or to refinish such articles as farm, industrial, and construction equipment, automobiles, and trucks, and to paint structures such as bridges, buildings, appliances, metal furniture, and the like.

18 Claims, No Drawings

COATING OF FATTY ACID-MODIFIED GLYCIDYL COPOLYMER, OH POLYMER AND OPTIONAL ANHYDRIDE POLYMER

FIELD OF THE INVENTION

The present invention relates to a multi-component coating composition. More particularly, the invention relates to a multi-component coating composition comprising a fatty acid modified glycidyl-containing component and a hydroxy-functional polymer.

BACKGROUND AND SUMMARY OF THE INVENTION

There are a wide variety of multi-component coating compositions available for finishing substrates. Typically, the components are mixed together before application and then the resulting composition is applied by conventional techniques, such as spraying, roll coating, curtain coating, dipping, or flow coating, and the composition is cured at ambient or at elevated temperatures. These compositions are used to originally finish or to refinish such articles as farm, industrial, and construction equipment, automobiles, and trucks, and to paint structures such as bridges, buildings, appliances, metal furniture, such as cabinets and shelves, and the like.

Numerous patents disclose such coating compositions. For example, European Patent Application 0 123 793 discloses a two-component coating composition with one component having an anhydride ring that is opened with an amine and a second component containing glycidyl groups. Finishes formed from such compositions are not useful for articles exposed to high humidity, such as farm, industrial, and construction equipment, automobiles, trucks, and structures such as bridges and buildings, since the finishes whiten and blister on exposure to high humidity, and exhibit recoat lifting when refinished within several days after the original finish has been applied.

U.S. Pat. No. 3,136,736 and British Patent No. 994,881 disclose coating compositions comprising polyepoxides and maleic anhydride copolymers, but do not teach or suggest the use of fatty acid modified glycidyl-containing components or of hydroxy-functional polymers.

U.S. Pat. No. 4,732,791 describes a coating composition comprising olyepoxides, a monomeric anhydride curing agent, and a low number average molecular weight hydroxyl group-containing polyfunctional material. However, the composition described must be heated to cure, contains monomeric anhydrides rather than polymeric anhydrides, and does not teach or suggest the use of fatty acid modified glycidyl-containing components.

U.S. Pat. No. 5,057,555 describes a coating composition comprising a polyepoxide, polymeric anhydride, and a polymer with multiple hydroxyl groups, but does not teach or suggest the use of fatty acid modified glycidyl-containing components. These coating compositions have higher viscosities than the coating compositions of the present invention and a shorter shelf-life. U.S. Pat. No. 5,270,362 suggests the use of a low molecular weight hydroxy-functional polyester to reduce the viscosity of such coating compositions, but does not suggest the use of fatty acid modified glycidyl-containing components. The compositions disclosed in the '362 patent have a shorter shelf-life than those of the present invention.

U.S. Pat. No. 5,977,255 discloses a coating composition comprising a polyepoxy compound crosslinked with an amine-functional organosilicon, but does not teach or suggest the use of fatty acid modified glycidyl-containing components. This composition has an improved shelf-life and lowered viscosity, but is not curable at ambient temperatures in contrast to the composition of the present invention.

U.S. Pat. No. 5,977,255 discloses a coating composition comprising a polyepoxy with polymeric acid anhydride group in the form of a half-ester. This composition exhibits improved stability and good reactivity, but is not curable at ambient temperatures in contrast to the presently claimed composition.

There is a need for a coating composition, such as that of the present invention, that cures at ambient temperatures and provides a high quality finish that is useful as an exterior finish or refinish for industrial, agricultural, and construction equipment, and the like, that exhibits superior adhesion to the substrate, excellent weatherability, for example, humidity resistance, and that has a pleasing appearance.

Furthermore, advantageously the presently claimed coating composition may optionally employ a two-component system whereas three different polymers or components are required in some of the previously described coating compositions, such as the coating composition described in U.S. Pat. No. 5,057,555. Also, elimination of the polymeric anhydride, as is possible with the compositions of the present invention, produces lower viscosity coatings. Lowered viscosity results in better sprayability, and reduces the amount of environmentally hazardous volatile organic compounds required as less organic solvent may be used to obtain a coating composition with the desired viscosity.

In one embodiment of the present invention a coating composition having a hard, glossy and tack-free finish is provided. The coating composition comprises about 20 to about 80 percent by weight of reactive binder components wherein the binder components comprise:

(a) 0 to about 24 percent based on the binder weight of an anhydride acrylic polymer having at least two reactive anhydride groups and comprising the product of polymerization of monomers of an ethylenically unsaturated anhydride or an ethylenically unsaturated dicarboxylic acid and monomers selected from the group consisting of $C_1$–$C_8$ alkyl methacrylate, $C_1$–$C_8$ alkyl acrylate, vinyl monomers and mixtures thereof, the acrylic polymer having a weight average molecular weight of about 2,000 to about 50,000;

(b) about 5 to about 50 percent based on the binder weight of a fatty acid modified glycidyl component having hydroxy functionality and at least two reactive glycidyl groups and at least two reactive unsaturation groups; and (c) about 5 to about 60 percent based on the binder weight of a polymeric component containing multiple hydroxy groups selected from the group consisting of acrylic polyols, polyester polyols, polyesterurethane polyols, polyether polyols, acrylourethane polyols and any mixtures thereof and having a weight average molecular weight of about 3,000 to about 20,000. The coating composition further comprises about 0.1 to about 15 percent based on the binder weight of a catalyst having the capacity to be incorporated into the polymer, a maximum of about 25 percent based on the binder weight of an aromatic vinyl, and about 20 to about 80 percent by weight of a solvent.

In another embodiment of the invention the glycidyl component is selected from the group consisting of a polyglycidyl ether of a low molecular weight polyol, an epoxy resin of epichlorohydrin and bisphenol A, a polyglycidyl ester of polyacids, polyglycidyl ethers of isocyanurates, a glycidyl methacrylate or a glycidyl acrylate containing acrylic polymer, and mixtures thereof.

In yet another embodiment of the invention the glycidyl polymeric component is modified with a fatty acid selected from the group consisting of a dehydrated caster oil fatty acid, a tall oil fatty acid, a soya oil fatty acid, a linseed oil fatty acid, and a coconut fatty acid.

In another embodiment of the invention the anhydride acrylic polymer contains about 0.1 to about 50 percent by weight of monomers selected from the group consisting of styrene acrylonitrile, methacrylonitrile and mixtures thereof.

In an alternate embodiment of the invention the anhydride acrylic polymer consists essentially of about 20 to about 40 percent by weight, based on the weight of the acrylic polymer, of methyl methacrylate, styrene, or mixtures thereof, about 35 to about 55 percent by weight of an alkyl methacrylate or an alkyl acrylate having 2–4 carbon atoms in the alkyl group and about 5 to about 55 percent by weight of polymerizable ethylenically unsaturated anhydride or ethylenically unsaturated dicarboxylic acid.

In still another embodiment of the invention the polymeric component containing multiple hydroxy groups is a polymer comprising polymerized monomers of a hydroxy alkyl methacrylate or an hydroxy alkyl acrylate and polymerized monomers selected from the group consisting of alkyl methacrylate, alkyl acrylate and mixtures thereof, wherein the alkyl groups have 1–12 carbon atoms and the polymer has a weight average molecular weight of about 3,000 to about 20,000.

In an alternate embodiment of the invention the polymeric component containing multiple hydroxy groups contains about 0.1 to about 50 percent by weight of monomers selected from the group consisting of styrene, acrylonitrile, methacrylonitrile, and mixtures thereof.

In another embodiment of the invention a coating composition having a hard, glossy and tack-free finish is provided. The coating composition comprises about 50 to about 90 percent by weight of reactive binder components and about 10 to about 40 percent by weight of an organic solvent wherein the binder comprises (a) about 1 to about 20 percent by weight, based on the binder weight, of an anhydride acrylic polymer having at least two reactive anhydride groups and comprising the product of polymerization of monomers of an ethylenically unsaturated anhydride and monomers selected from the group consisting of $C_1$–$C_8$ alkyl methacrylate, $C_1$–$C_8$ alkyl acrylate, aromatic vinyl monomers and mixtures thereof, wherein the alkyl groups have 1–8 carbon atoms and wherein the acrylic polymer has a weight average molecular weight of about 2,000 to about 40,000;

(b) about 20 to about 80 percent by weight, based on the binder weight, of a fatty acid modified glycidyl component comprising the product of polymerization of unsaturated fatty acids, monomers of an ethylenically unsaturated epoxide and monomers selected from the group consisting of $C_1$–$C_8$ alkyl methacrylate, $C_1$–$C_8$ alkyl acrylate, aromatic vinyl monomers and mixtures thereof, wherein the alkyl groups have 1–8 carbon atoms, wherein the acrylic polymer has a weight average molecular weight of about 2,000 to about 40,000, and wherein the polymer has an epoxide equivalent weight of about 200 to about 1000; and (c) about 20 to about 80 percent by weight, based on the binder weight, of an acrylic polymer having both tertiary amine functionality and hydroxyl functionality comprising the product of polymerization of monomers of hydroxy alkyl acrylate or hydroxy alkyl methacrylate, monomers selected from the group consisting of alkylamino alkyl acrylate, alkylamino alkyl methacrylate, alkylamino alkyl methacrylamide, alkyl acrylate, alkyl methacrylate, aromatic vinyl compounds, and mixtures thereof, wherein the alkyl groups have 1–8 carbon atoms, the polymer has a weight average molecular weight of about 2,000 to about 40,000, and wherein the polymer has a tertiary amine equivalent weight of about 200 to about 1000.

In an alternate embodiment of the invention a coating composition having a hard, glossy and tack-free finish is provided. The coating composition comprises about 50 to about 90 percent by weight of reactive binder components and about 10 to about 40 percent by weight of an organic solvent wherein the binder comprises (a) about 20 to about 80 percent by weight, based on the binder weight, of a fatty acid modified glycidyl component comprising the product of polymerization of unsaturated fatty acids, monomers of an ethylenically unsaturated epoxide and monomers selected from the group consisting of $C_1$–$C_8$ alkyl methacrylate, $C_1$–$C_8$ alkyl acrylate, aromatic vinyl monomers and mixtures thereof, wherein the alkyl groups have 1–8 carbon atoms, wherein the acrylic polymer has a weight average molecular weight of about 2,000 to about 40,000, and wherein the polymer has an epoxide equivalent weight of about 200 to about 1000; and (b) about 20 to about 80 percent by weight, based on the binder weight, of an acrylic polymer having both tertiary amine functionality and hydroxyl functionality comprising the product of polymerization of monomers of hydroxy alkyl acrylate or hydroxy alkyl methacrylate, monomers selected from the group consisting of alkylamino alkyl acrylate, alkylamino alkyl methacrylate, alkylamino alkyl methacrylamide, alkyl acrylate, alkyl methacrylate, aromatic vinyl compounds, and mixtures thereof, wherein the alkyl groups have 1–8 carbon atoms, the polymer has a weight average molecular weight of about 2,000 to about 40,000, and wherein the polymer has a tertiary amine equivalent weight of about 200 to about 1000.

In another embodiment of the invention a method for increasing the abrasion resistance and improving the weatherability of a metal or plastic substrate is provided. The method comprises the steps of mixing the components of any of the coating compositions described above, applying the mixture to the metal or plastic substrate, and curing the coating composition at ambient temperature or by heating. An article of manufacture prepared in accordance with this method is also provided.

DETAILED DESCRIPTION OF THE INVENTION

The composition of the present invention forms an excellent clear coating over colored pigmented finishes or can be pigmented to form a colored finish. The coating exhibits superior adhesion to pigmented finishes, has excellent humidity resistance, is otherwise weatherable, and is durable. The pigmented or unpigmented coating composition of the present invention is useful for finishing and refinishing the exterior of industrial, agricultural, and construction equipment, automobiles, tanks, and trucks, and to paint structures such as bridges, buildings, for example, factories and oil refineries, appliances, metal furniture, such as cabinets and shelves, and the like. The coating composition can also be used for finishing plastic substrates.

Preferably, the coating composition has a high solids content and contains about 40 to about 80 percent by weight binder and about 20 to about 60 percent by weight of organic solvent. The binder of the composition contains about 0 to about 24 percent by weight of anhydride acrylic polymer containing at least two anhydride groups, about 5 to about 50 percent by weight of a fatty acid modified glycidyl-containing component with at least two reactive glycidyl groups and two reactive unsaturation sites, and about 5 to about 60 percent by weight of a polymeric component containing multiple hydroxyl groups.

The anhydride acrylic polymer has a weight average molecular weight of about 2,000 to about 50,000 determined by gel permeation chromatography using polystyrene as a standard and, preferably, has a weight average molecular weight of about 3,000 to about 25,000. The anhydride acrylic polymer is prepared by conventional techniques in which the monomers, solvent, and conventional catalysts such as dicumyl peroxide are charged into a polymerization vessel and heated to about 75–200° C. for about 0.5–6 hours to form the polymer.

The anhydride acrylic polymer is formed by polymerizing monomers of alkyl methacrylates, or alkyl acrylates or mixtures thereof, wherein the alkyl groups have 1–12 carbon atoms and ethylenically unsaturated anhydrides (or ethylenically unsaturated dicarboxylic acids which are converted to the acid anhydride during polymerization). Optionally, the anhydride acrylic polymer can contain other components such as styrene, alpha.-methyl styrene, acrylonitrile, methacrylonitrile in amounts of about 0.1 to about 50 percent by weight.

Typical alkyl acrylates and methacrylates that can be used to form the anhydride acrylic polymer are methyl methacrylate, ethyl methacrylate, ethylhexyl acrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the anhydride acrylic polymer are acrylamide, methacrylamide, acrylo alkoxy silanes, such as gamma methacryloyl propyl trimethoxy silane. Also the anhydride acrylic polymer can contain about 0.1 to about 5 percent by weight of an ethylenically unsaturated acid such as acrylic acid, methacrylic acid, itaconic acid, maleic acid, and the like.

Typically, useful ethylenically unsaturated anhydrides include itaconic anhydride, maleic anhydride, isobutenyl succinic anhydride, and the like. It is also possible to impart the anhydride functionality to the anhydride acrylic polymer by using the appropriate ethylenically unsaturated dicarboxylic acid which converts to the corresponding acid anhydride by simple heating. Ethylenically unsaturated dicarboxylic acids that can be used in accordance with the present invention are itaconic acid, maleic acid, isobutenyl succinic acid, and the like.

Preferred anhydride acrylic polymers include styrene/metyl methacrylate/butylacrylate/maleic anhydride, methyl methacrylate/butyl acrylate/itaconic anhydride, butyl acrylate/styrene/maleic anhydride/maleic acid, and methyl methacrylate/butyl acrylate/itaconic anhydride.

The anhydride equivalent weight is preferably from about 1000 to about 2000. More preferably, the anhydride equivalent weight is from about 1400 to about 1600.

The glycidyl component contains at least two glycidyl groups and can be an oligomer or a polymer. Exemplary glycidyl components include sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A, di- and polyglycidyl esters of acids, polyglycidyl ethers of isocyanurates, (e.g., Denecol EX301 from Nagase). Sorbitol polyglycidyl ether (e.g., Araldite XUGY-358.RTM. from Ciba-Geigy), and di- and polyglycidyl esters of acids (e.g., Araldite CY-184.RTM. from Ciba-Geigy), are preferred since they form high quality finishes.

Glycidyl methacrylate or acrylate-containing acrylic polymers can also be used such as random and block polymers of glycidyl methacrylate/ethylhexyl acrylate/styrene. The block polymers can be prepared by free radical polymerization, anionic polymerization or by group transfer polymerization.

The fatty acid used to modify the glycidyl component can be fatty acids such as a dehydrated caster oil fatty acid, a tall oil fatty acid, a soya oil fatty acid, a linseed oil fatty acid, a coconut fatty acid, and the like. The composition of common vegetable oils that may be used in accordance with the invention is shown in Tables I and II along with the percentage of the oil that each fatty acid comprises.

| I. Fatty Acid Compositions of Some of the More Common Vegetable Oils (Approximate % Composition) | | | | | | | | |
|---|---|---|---|---|---|---|---|---|
| Fatty Acids | | Unsaturation | Coconut Oil | Castor Oil | Grape Seed Oil | Linseed Oil | Oiticica Oil | Palm Oil | Palm Kernel Oil |
| 8 Caprylic | $C_8H_{16}O_2$ | | 6 | | | | | | 3 |
| 10 Capric | $C_{10}H_{20}O_2$ | | 6 | | | | Contains 4% hydroxy acids | | 4 |
| 12 Lauric | $C_{12}H_{24}O_2$ | | 44 | | | | | | 51 |
| 14 Myristic | $C_{14}H_{28}O_2$ | | 18 | | | | | 1 | 17 |
| 16 Palmitic | $C_{16}H_{32}O_2$ | | 11 | 2 | 9 | 6 | 7 | 48 | 8 |
| 18 Stearic | $C_{18}H_{34}O_2$ | | 6 | 1 | 4 | 4 | 5 | 4 | 2 |
| Oleic | $C_{18}H_{34}O_2$ | (−2H) | 7 | 7 | 20 | 22 | 6 | 38 | 13 |
| Ricinoleic | $C_{18}H_{34}O_2$ | (−2H) | | 87 | | | | | |
| Linoleic | $C_{18}H_{34}O_2$ | (−4H) | 2 | 3 | 67 | 16 | | 9 | 2 |
| Linolenic | $C_{18}H_{30}O_2$ | (−6H) | | | | 52 | | | |
| Eleostearic | $C_{18}H_{30}O_2$ | (−6H) | | | | | | | |
| Licanic | $C_{18}H_{28}O_2$ | (−6H) | | | | | 78 | | |

-continued

I. Fatty Acid Compositions of Some of the More Common Vegetable Oils
(Approximate % Composition)

| Fatty Acids | | Unsaturation | Coconut Oil | Castor Oil | Grape Seed Oil | Linseed Oil | Oiticica Oil | Palm Oil | Palm Kernel Oil |
|---|---|---|---|---|---|---|---|---|---|
| Eicosanoic | $C_{20}H_{40}O_2$ | | | | | | | | |
| Arachidonic | $C_{20}H_{32}O_2$ | (−6H)·(10H) | | | | | | | |
| Docosanoic | $C_{22}H_{44}O_2$ | | | | | | | | |
| Clapanodonic | $C_{22}H_{30}O_2$ | (−6H)·(10H) | | | | | | | |
| Tetracosanoic | $C_{24}H_{48}O_2$ | | | | | | | | |
| Nisinic | $C_{24}H_{38}O_2$ | (−10H) | | | | | | | |
| Approximate analytic constants | | | | | | | | | |
| Iodine Value | | | 7.5–10.5 | 81–91 | 130–140 | 155–205 | 140–160 | 44–54 | 14–23 |
| Saponification Value | | | 250–264 | 176–187 | 185–195 | 188–196 | 186–193 | 195–205 | 245–25 |
| Melting Point °C. | | | 23–26 | | | | | 27–50 | 24–26 |
| Titre °C. | | | 20–24 | | −17 | 19–21 | 42–47 | 40–47 | 20–28 |
| Uses | | | Short Oil non-drying Alkyd resins Epoxy resins | Plasticiser in ink systems Plasticising alkyds | Alkyd resins | Oleo-resinous varnish Long oil alkyd | Oleoresin varnish Alkyd resins | Short oil no-drying Alkyd resins | |

II. Fatty Acid Composition of Some of the More Common Vegetable Oils
(Approximate % Composition)

| Fatty Acids | | Unsaturation | Safflower Oil | Sunflower Oil | Soya Bean Oil | Tung Oil | Tall Oil* | Dehydrated Castor Oil* | Corn Oil | Cotton-seed Oil | Olive Oil | Peanut Oil |
|---|---|---|---|---|---|---|---|---|---|---|---|---|
| 8 Caprylic | $C_8H_{16}O_2$ | | | | | | | | | | | |
| 10 Capric | $C_{10}H_{20}O_2$ | | | | | | | | | | | |
| 12 Lauric | $C_{12}H_{24}O_2$ | | | | | | | | | | | |
| 14 Myristic | $C_{14}H_{28}O_2$ | | | | | | | | | | | |
| 16 Palmitic | $C_{16}H_{32}O_2$ | | 8 | 11 | 11 | 4 | 5 | | 13 | 29 | 14 | 6 |
| 18 Stearic | $C_{18}H_{34}O_2$ | | 3 | 6 | 4 | 1 | 2 | | 4 | 4 | 2 | 5 |
| Oleic | $C_{18}H_{34}O_2$ | (−2H) | 13 | 29 | 25 | 8 | 48 | 9 | 29 | 24 | 64 | 64 |
| Ricinoleic | $C_{18}H_{34}O_2$ | (−2H) | | | | | | 8 | | | | |
| Linoleic | $C_{18}H_{34}O_2$ | (−4H) | 75 | 52 | 51 | 4 | 45 | 83 | 54 | 40 | 16 | 22 |
| Linolenic | $C_{18}H_{30}O_2$ | (−6H) | 1 | 2 | 9 | 3 | | | | | | |
| Eleostearic | $C_{18}H_{30}O_2$ | (−6H) | | | | 80 | | | | | | |
| Licanic | $C_{18}H_{28}O_2$ | (−6H) | | | | | | | | | | |
| Eicosanoic | $C_{20}H_{40}O_2$ | | | | | | | | | | | 2 |
| Arachidonic | $C_{20}H_{32}O_2$ | (−6H)·(10H) | | | | | | | | | | |
| Docosanoic | $C_{22}H_{44}O_2$ | | | | | | | | | | | 3 |
| Clapanodonic | $C_{22}H_{30}O_2$ | (−6H)·(10H) | | | | | | | | | | |
| Tetracosanoic | $C_{24}H_{48}O_2$ | | | | | | | | | | | |
| Nisinic | $C_{24}H_{38}O_2$ | (−10H) | | | | | | | | | | 1 |
| Approximate analytic constants | | | | | | | | | | | | |
| Iodine Value | | | 140–150 | 125–136 | 120–141 | 160–175 | 130–138 | 145–155 | | | | |
| Saponification Value | | | 188–194 | 188–194 | 185–195 | 189–195 | 192–194 | 200–204 | | | | |
| Melting Point °C. | | | | | | | | | | | | |
| Titre °C. | | | 15–18 | 16–20 | 20–21 | 36–37 | | | | | | |
| Uses | | | Alkyd resins | Alkyd resins | Alkyd resins | Oleo-resinous varnish Alkyd resins | Alkyd resins | Alkyd resins | | | | |

*Typical tall oil fatty acids (2% resin) and dehydrated castor oil shown for completeness The residual epoxide equivalent weight for the glycidyl component is preferably from about 200 to about 1000. More preferably, the residual epoxide equivalent weight for the glycidyl component is from about 600 to about 800. The fatty acid equivalent weight is preferably from about 1000 to about 2000. More preferably, the fatty acid equivalent weight is from about 1400 to about 1600.

The hydroxy functional polymeric material has a weight average molecular weight of about 3,000 to about 20,000 and has multiple hydroxyl groups. The hydroxyl group containing materials can have a hydroxy value of about 50 to about 300. Typical, but non-limiting, examples thereof are polymeric polyols such as acrylic polyols, polyester polyols, polyesterurethane polyols, polyether polyols, acryloure-thane polyols and mixtures thereof.

The acrylic polyols can be formed by polymerizing monomers of alkyl methacrylates or alkyl acrylates or mixtures thereof (where the alkyl groups have 1–12 carbon atoms) and hydroxy-functional alkyl (meth)acrylate (where (meth)acrylate means either acrylate or methacrylate). Optionally, the acrylic polyols contain other components such as styrene, .alpha.-methyl styrene, acrylonitrile, and methacrylonitrile, and the like, in amounts of about 0.1 to about 50 percent by weight. Typical alkyl acrylates and methacrylates are discussed above in the description of the anhydride acrylic polymer.

The polyesterurethane polyol is the reaction product of a hydroxyl-terminated polyester and a polyisocyanate, preferably, an aliphatic diisocyanate. The urethane has a hydroxyl number of about 75 to about 200 and has a weight average molecular weight of about 3,000 to about 25,000 and a number average molecular weight of about 2,000 to about 6,000 measured using gel permeation chromatography using polystyrene as a standard.

The polyester used to form the polyester urethane is the esterification product of an alkylene glycol, a polyhydric alcohol having at least three hydroxy groups, and an aromatic dicarboxylic acid or its anhydride. Preferably, the polyester has a hydroxyl number of about 100 to about 200. Typical alkylene glycols, polyhydric alcohols and aromatic dicarboxylic acids or its anhydride are described in U.S. Pat. No. 4,614,683. The '683 patent also describes typical polyisocyantes.

The amine equivalent weight for the hydroxy functional polymer is from about 200 to about 1000. More preferably, the amine equivalent weight is from about 600 to about 800. The hydroxy equivalent weight is from about 400 to about 1200. More preferably, the hydroxy equivalent weight is from about 800 to about 1000.

About 0 to about 5 percent by weight, based on the weight of the binder of the coating composition, of an external catalyst is added to enhance curing of the composition. Exemplary of catalysts for use in accordance with the present invention are triethylene diamine, quinuclidine, dialkyl alkanol amines such as dimethyl ethanolamine, diethyl ethanol amine, dibutyl ethanol amine, diethyl hexanol amine and the like, lithium tertiary butoxide, tri (dimethylaminomethyl)phenol, bis(dimethylamino)propan-2-ol, N,N,N$^1$,N$^1$-tetramethylethylenediamine, N,methyldiethanolamine, N,N-dimethyl-1,3-propanediamine and 1-dimenthylamino-2-propanol or quaternary ammonium salts such as tert-butyl ammonium bromide, benzyl trimethyl ammonium formate and the like. In addition, the catalyst can be incorporated in the polymeric chain by using amino-functional alkyl acrylates such as 2-dimethyl amino ethyl methacrylate, 2-diethyl amino ethyl methacrylate, vinyl pyridine, and tert-butyl amino ethyl methacrylate.

Alternatively, the catalyst need not be added to the coating composition, but after an article is coated, the article may be passed into a chamber containing catalyst vapors. Dimethylethanol amine is a catalyst that can be vaporized and used to cure the coating composition. In still another embodiment of the invention, to achieve curing, the catalyst may be sprayed with the coating composition using a dual spray gun.

Solvents for use in preparing the anhydride acrylic polymer and for use as a diluent for the coating composition include toluene, xylene, butyl acetate, methyl amyl ketone, ethyl benzene, higher boiling point aromatic hydrocarbons, amyl acetate, ethyl acetate, propyl acetate, and ethylene or propylene glycol mono alkyl ether acetates.

In addition, certain alcoholic solvents are also useful in accordance with the present invention. The alcoholic solvents under certain use conditions convert portions of the anhydride to half-esters also useful as reactants in the system of the present invention. Examples of such alcohols are propanol, isobutanol, methanol, isopropanol, tertiary butanol, n-butanol, propylene glycol monomethyl ether, ethylene glycol monobutyl ether, and other alcoholic solvents. The coating composition comprises about 20 to about 80 percent by weight of solvent.

To improve weatherability of the clear finish of the coating composition, about 0.1 to about 5 percent, by weight, based on the weight of the binder, of an ultraviolet light stabilizer or mixtures thereof can be added. These stabilizers include ultraviolet light absorbers, screeners, quenchers and specific hindered amine light stabilizers. Also, about 0.1 to about 5 percent by weight, based on the weight of the binder, of an antioxidant can be added.

Typical ultraviolet light stabilizers useful in accordance with the present invention include benzophenones such as hydroxydodecyclobenzophenone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2', 4-trihydroxy-4'-alkoxybenzophenone, 2-hydroxy-4-methoxy-2,-carboxybenzophenone; triazoles such as 2-phenyl-4-(2,-4,-dihydroxybenzoyl)triazoles, substituted benzotriazoles such as hydroxyphenyltriazoles such as 2-(2'hydroxy-5'-methylphenyl)benzotriazole, 2-(2'hydroxyphenyl)benzo-triazole, 2-(2'-hydroxy-5'-octylphenyl)naphthotriazole; triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine; benzoates such as dibenzoate of diphenylolpropane, t-butyl benzoate of diphenylolpropane, nonyl phenyl benzoate, octyl phenyl benzoate, and resorcinol dibenzoate.

Other ultraviolet light stabilizers that are useful in the invention include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlenesubstituted oxalic acid diamides, methyl-.beta.-(3,5-di-t-butyl-4-hydroxyphenyl)propionate, .alpha.,.alpha.'-bis(2-hydroxyphenyl)diisopropylbenzene, 3,5'-dibromo-2'-hydroxyacetophenone, ester derivatives of 4,4-bis(4'-hydroxyphenyl)pentaonic acid wherein there is at least one unsubstituted position ortho to the aromatic hydroxyl groups, organophosphorus sulfides such as bis(diphenylphosphinothioyl)monosulfide and bis(diphenylphosphinothioyl)disulfide, 4-benzoyl-6-(dialkylhydroxybenzyl)resorcinol, bis(3-hydroxy-4-benzoylphenoxy)diphenylsilane, bis(3-hydroxy-4-benzoylphenoxy) dialkylsilane, 1,8-naphthalimides,.alpha.-cyano-.beta.,.beta.-diphenylacrylic acid derivatives, bis(2-benzoxazolyl)alkanes, bis(2-naphthoxazolyl)alkanes, methylene malonitriles containing aryl and heteroacyclic substitutes, alkylenebis(dithio)carbamate, 4-benzoyl-3-hydroxyphenoxyethyl acrylate, 4-benzoyl-3-hydroxyphenoxyethyl-methacrylate, aryl or alkyl-substituted acrylonitriles, 3-methyl-5-isopropylphenyl-6-hydroxycourmarone, and 8-acetyl-3-dodecyl-7,7,9,9-tetramethyl-1,3,8-triazaspric(4,5)decanol-2,4-d ione.

Particularly useful ultraviolet light stabilizers are hindered amines of piperidyl derivatives such as those disclosed in U.S. Pat. No. 4,061,616 incorporated herein by reference, and nickel compounds such as [1-phenyl-3-methyl-4-decanoylpyrazolate (5)]-Ni, bis[phenyldithiocarbamato]-Ni (II), and others listed in the '616 patent.

The following blend of ultraviolet light stabilizers is exemplary of a light stabilizer composition that can be used in the invention. Such a composition includes 2-[2'-hydroxy-3',5'-1(1-1-dimethyl-propyl) phenyl]benzotrizole and bis-[4-(1,2,2,6,6-pentamethylpiperidyl)] 2-butyl-2-[(3,5-t-butyl-4-hydroxyphenyl)methyl] propanedioate. The stabilizers can be used in any ratio, however, a 1:1 ratio of benzotriazole to propanedioate is preferred. Another useful blend of ultraviolet light stabilizers is 2-(benzotriazole-2-VL)-4,6-bis (methyl-ethyl-1-phenyl ethyl)phenol, and 2(3 hydroxy-3,5'-ditert amyl phenyl) benzotriazole.

The composition can be pigmented to form a colored finish or a primer. About 0.1 to about 200 percent by weight, based on the weight of the binder, of pigment can be added. Pigments may be of any conventional type, such as, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake. The pigment can be added using conventional techniques in which a mill base-containing pigment, dispersant, and solvent is first mixed. The mill base is then mixed with the coating composition to form a colored composition. This composition can be applied and cured as described below. In addition, various fillers, plasticizers, anti-oxidants, ultraviolet light absorbers, flow control agents, surfactants and other formulating additives can be employed if desired.

In one embodiment of the invention a method for increasing the abrasion resistance and improving the weatherability of a metal or plastic substrate is provided. The method comprises the steps of mixing the components of any of the coating compositions described above, applying the mixture to a metal or plastic substrate, and curing the coating composition at ambient temperature or by heating.

The components of the coating composition of the present invention can be mixed and applied to the substrate immediately thereafter. Alternatively, the components can be mixed, and the coating composition applied to the substrate after waiting for any period of time. For example, the coating composition can be applied to the substrate after waiting for a period of time during which the substrate is prepared for application of the coating composition.

Generally, when used as a clear or pigmented coating, the composition is applied by conventional techniques such as air atomized spray, high volume low pressure spray, airless spray, air assisted airless spray, electrostatic air atomized spray, electrostatic bell, electrostatic disk, roll coating, reverse roll coating, curtain coating, dipping, or flow coating. For the application to plastic sheets, spray application, rollcoating, or curtain coating are preferred. The viscosity of the coating may be adjusted by the selection and addition of suitable solvents as is well known to those skilled in the art of coating formulations and their application. Further the coating composition of the present invention may be used as the sole film-forming composition on the substrate, or may be utilized as a primer or adhesion promoting layer for subsequent applications.

The resulting coating can be dried and cured at ambient temperatures or can be cured at elevated temperatures of about 60 to about 200° C. Generally, the coatings are baked at about 60 to about 140° C. for about 10 to about 40 minutes or are dried at ambient temperatures. At ambient temperatures, the coating dries to a tack-free condition in about 180 minutes and in about 24 hours the coating is substantially cured. In about 5–7 days, the coating is completely cured.

Coatings are applied to form a finish about 0.5 to about 5 mils thick, and, preferably, about 1 to about 2 mils thick. The finish has excellent gloss, superior adhesion to substrate, excellent weatherability, and high solids.

The invention is further described by reference to the following examples. These examples are illustrative of the present invention and are not intended to limit the scope of the invention in any manner. All parts and percentages are on a weight basis unless indicated otherwise. Molecular weights are determined by gel permeation chromatography using polystyrene as the standard.

EXAMPLE 1

Anhydride Acrylic Polymer

The following constituents were charged into a reactor with a thermocouple, stirrer, addition funnel, nitrogen induction tube, and condenser:

|  | Parts by Weight |
| --- | --- |
| Portion 1 | |
| Methyl Amyl Ketone | 23.4 |
| Portion 2 | |
| Maleic Anhydride | 4.6 |
| Styrene | 19.5 |
| Methyl Methacrylate | 11.5 |
| Butyl Methacrylate | 34.9 |
| Portion 3 | |
| Methyl Amyl Ketone | 2.6 |
| Dicumyl Peroxide | 3.3 |
| Portion 4 | |
| Methyl Amyl Ketone | 0.18 |
| Dicumyl Peroxide | 0.02 |

Portion 1 was charged to the reactor, covered with a nitrogen blanket and heated to 145° C. Portion 2 was added dropwise over a 360 minute period. Portion 3 was added simultaneously with portion 2. After completion of the addition, the resulting composition was held at 145° C. for 1 hour. Portion 4 was then added over a 5 minute period after completion of the 1 hour hold.

The resulting polymer composition was reduced to 60–62 percent weight solids with Methyl Amyl Ketone. The resulting polymer composition had a Gardner-Holdt viscosity of I-L. The polymer composition had a weight average molecular weight of 5900. The theoretical anhydride equivalent weight is 1502.

Gylcidyl Component Polymer

The following were charged into a reactor equipped with a thermocouple, stirrer, addition funnel, nitrogen induction tube and condenser:

|  | Parts by Weight |
| --- | --- |
| Portion 1 | |
| Methyl Amyl Ketone | 25.7 |

-continued

| | Parts by Weight |
|---|---|
| Portion 2 | |
| Styrene | 15.6 |
| 2-Ethylhexyl Acrylate | 18.2 |
| Glycidyl Methacrylate | 23.4 |
| Portion 3 | |
| Methyl Amyl Ketone | 1.8 |
| Dicumyl Peroxide | 2.0 |
| Portion 4 | |
| Methyl Amyl Ketone | 0.1 |
| Dicumyl Peroxide | 0.1 |
| Portion 5 | |
| Dehydrated Castor Oil Fatty Acid | 13.1 |
| Triphenyl Phosine | 0.0004 |

Portion 1 was charged into the reactor, covered with a nitrogen blanket and heated to 145° C. Portion 2 was added dropwise over a 240 minute period. Portion 3 was added simultaneously with portion 2. After completion of the addition, the resulting composition was held at 145° C. for 1 hour. Portion 4 was then added over a 5 minute period after completion of the 1 hour hold. The resulting composition was then cooled to less then 100° C. Portion 5 was then added over a 5 minute period and the temperature was raised to 145° C. The resulting composition was held at 145° C. until an acid value less than 1 was obtained.

The resulting polymer composition was reduced to 65–68 percent weight solids with Methyl Amyl Ketone. The resulting polymer composition had a Gardener-Holdt viscosity of T-X. The resulting polymer composition had a weight average molecular weight of 24000. The theoretical residual epoxide equivalent weight and the theoretical fatty acid equivalent weight are 1508 and 595, respectively.

Hydroxy Functional Polymer

The following constituents were charged into a reactor equipped with a thermocouple, stirrer, addition funnel, nitrogen induction tube, and condenser:

| | Parts by Weight |
|---|---|
| Portion 1 | |
| Methyl Amyl Ketone | 23.3 |
| Portion 2 | |
| Styrene | 21.3 |
| Hydroxyethyl Methacrylate | 9.9 |
| Dimethyl-Aminoethyl Methacrylate | 15 |
| Butyl Acrylate | 17.7 |
| Methyl Methacrylate | 3.6 |
| Portion 3 | |
| Methyl Amyl Ketone | 5.6 |
| 2,2'-azobis(methylbutyronitrile) | 3.6 |
| Portion 4 | |
| Methyl Amyl Ketone | 0.004 |
| 2,2'-azobis(methylbutyronitrile) | 0.002 |

Portion 1 was charged into the reactor, covered with a nitrogen blanket and heated to 110° C. Portion 2 was added dropwise over a 360 minute period. Portion 3 was added simultaneously with portion 2. After completion of the addition, the resulting composition was held at 110° C. for 1 hour. Portion 4 was then added over a 5 minute period after completion of the 1 hour hold.

The resulting polymer composition was reduced to 60–62 percent weight solids with Methyl Amyl Ketone. The resulting polymer composition had a Gardener-Holdt viscosity of O-R. The resulting polymer composition had a weight average molecular weight of 8100. The theoretical hydroxy equivalent weight and the theoretical amine equivalent weight are 886 and 706, respectively. The experimental amine equivalent weight is 715.

EXAMPLE 2

A clear coating composition was prepared by thoroughly blending together the following constituents:

| | Parts by Weight |
|---|---|
| Portion 1 | |
| Hydroxy Containing Polymer Composition (prepared above) | 40 |
| Methyl Amyl Ketone | 59 |
| Flow Additive | 1 |
| Portion 2 | |
| Glycidyl Component Polymer (prepared above) | 40 |
| Methyl Amyl Ketone | 60 |

The resulting coating composition had a solids content of 40% to 50% and a viscosity of 15–30 seconds measured with a No. 3 EZ cup. Portion 1 and Portion 2 were mixed at an epoxy equivalent weight to amine equivalent weight of 0.5 to 20.0, preferably 1.0 to 1.5 and the coating composition was applied onto a metal panel and cured for 20 minutes at 180° C. The resulting film was hard and glossy and withstood greater than 100 double rubs with methyl ethyl ketone.

EXAMPLE 3

A pigmented coating composition was prepared by thoroughly blending together the following constituents:

| | Parts by Weight |
|---|---|
| Portion 1 | |
| Hydroxy Containing Polymer Composition (prepared above) | 40 |
| Methyl Amyl Ketone | 47.7 |
| Dispersant | 1.5 |
| UV stabilizer | 0.4 |
| Flow additive | 1.0 |
| Titanium Dioxide | 9.4 |
| Portion 2 | |
| Glycidyl Component Polymer (prepared above) | 40 |
| Methyl Amyl Ketone | 60 |

The resulting coating composition had a solids content of 40% to 60%, and a viscosity of 15–30 seconds measured with a No. 3 EZ cup. Portion 1 and Portion 2 were mixed at an epoxy equivalent weight to amine equivalent weight of 0.5 to 20.0, preferably 1.0 to 1.5 and the coating composition was applied onto a metal panel and cured for 20 minutes at 180° C. The resulting film was hard and glossy and withstood greater than 100 double rubs with methyl ethyl ketone.

What is claimed is:

1. A coating composition having a hard, glossy and tack-free finish comprising about 20 to about 80 percent by weight of a solvent and about 20 to about 80 percent by weight of reactive binder components wherein the binder components comprise (a) 0 to about 24 percent based on the binder weight of an anhydride acrylic polymer having at least two reactive anhydride groups and comprising the product of polymerization of monomers of an ethylenically unsaturated anhydride or an ethylenically unsaturated dicarboxylic acid and monomers selected from the group consisting of $C_1$–$C_8$ alkyl methacrylate, $C_1$–$C_8$ alkyl acrylate, vinyl monomers and mixtures thereof, said acrylic polymer having a weight average molecular weight of about 2,000 to about 50,000;

(b) about 5 to about 50 percent based on the binder weight of a fatty acid modified glycidyl polymer having hydroxy functionality, at least two reactive glycidyl groups and at least two reactive unsaturation groups prepared by reacting the glycidyl polymer with the fatty acid; and (c) about 5 to about 60 percent based on the binder weight of a polymeric component containing multiple hydroxy groups, said polymer component selected from the group consisting of acrylic polyols, polyester polyols, polyesterurethane polyols, polyether polyols, acrylourethane polyols, and mixtures thereof, having a weight average molecular weight of about 3,000 to about 20,000; and about 0.1 to about 15 percent based on the binder weight of a tertiary amine catalyst incorporated into the polymeric component, and said polymer component having a maximum of about 25 percent based on the binder weight of an aromatic vinyl monomen.

2. The coating composition of claim 1 in which the glycidyl polymer is selected from the group consisting of a polyglycidyl ether of a low molecular weight polyol, an epoxy resin of epichlorohydrin and bisphenol A, a polyglycidyl ester of polyacids, polyglycidyl ethers of isocyanurates, a glycidyl methacrylate or a glycidyl acrylate containing acrylic polymer, and mixtures thereof.

3. The coating composition of claim 1 wherein the glycidyl polymer is modified with a fatty acid selected from the group consisting of a dehydrated caster oil fatty acid, a tall oil fatty acid, a soya oil fatty acid, a linseed oil fatty acid, and a coconut fatty acid.

4. The coating composition of claim 1 wherein the anhydride acrylic polymer contains about 0.1 to about 50 percent by weight of monomers selected from the group consisting of styrene, acrylonitrile, methacrylonitrile and mixtures thereof.

5. The coating composition of claim 1 in which the anhydride acrylic polymer has a glass transition temperature of 0 to 75° C. and a weight average molecular weight of about 3,000 to about 25,000.

6. The coating composition of claim 1 wherein the anhydride acrylic polymer consists essentially of about 20 to about 40 percent by weight, based on the weight of the acrylic polymer, of methyl methacrylate, styrene, or mixtures thereof, about 35 to about 55 percent by weight of an alkyl methacrylate or an alkyl acrylate having 2–4 carbon atoms in the alkyl group and about 5 to about 55 percent by weight of polymerizable ethylenically unsaturated anhydride or ethylenically unsaturated dicarboxylic acid.

7. The coating composition of claim 1 wherein the polymeric component containing multiple hydroxy groups is a polymer comprising polymerized monomers of a hydroxy alkyl methacrylate or an hydroxy alkyl acrylate and polymerized monomers selected from the group consisting of alkyl methacrylate, alkyl acrylate and mixtures thereof, wherein the alkyl groups have 1–12 carbon atoms and the polymer has a weight average molecular weight of about 3,000 to about 20,000.

8. The coating composition of claim 6 wherein the polymeric component containing multiple hydroxy groups contains about 0.1 to about 50 percent by weight of monomers selected from the group consisting of styrene, acrylonitrile, methacrylonitrile, and mixtures thereof.

9. The coating composition of claim 6 wherein the catalyst is incorporated into the polymeric component containing multiple hydroxyl groups by using tertiary amino functional alkyl acrylates or methacrylates.

10. The coating composition of claim 1 wherein the polymeric component having multiple hydroxy groups is a polyesterurethane polyol which is the reaction product of a polyisocyanate and a polyester derived from the esterification product of an alkylene glycol, a polyhydric alcohol having at least three hydroxyl groups and an aromatic dicarboxylic acid or its anhydride.

11. The coating composition of claim 9 wherein the polyesterurethane polyol has a hydroxyl number of about 75 to about 200 and a weight average molecular weight of about 3,000 to about 20,000.

12. The coating composition of claim 6 wherein the glycidyl polymer is a polymer component comprising polymerized monomers of a glycidyl acrylate or glycidyl methacrylate and polymerized monomers selected from the group consisting of alkyl acrylates, alkyl methacrylates, and mixtures thereof.

13. The coating composition of claim 11 wherein the glycidyl polymer contains about 0.1 to about 50 percent by weight of monomers selected from the group consisting of styrene, acrylonitrile, methacrylonitrile, and mixtures thereof.

14. The coating composition of claim 11 wherein the glycidyl polymer is modified with a fatty acid selected from the group consisting of a dehydrated caster oil fatty acid, a tall oil fatty acid, a soya oil fatty acid, a linseed oil fatty acid, and a coconut fatty acid.

15. The coating composition of claim 11 wherein the anhydride acrylic polymer consists of polymerized monomers of methyl methacrylate and butyl acrylate.

16. The coating composition of claim 11 wherein the anhydride acrylic polymer consists of polymerized monomers of butyl acrylate, styrene, maleic anhydride and maleic acid.

17. The coating composition of claim 5 wherein the anhydride acrylic polymer consists essentially of polymerized monomers of methyl methacrylate, styrene, maleic anhydride, maleic acid and butyl acrylate and the glycidyl polymer consists essentially of polymerized monomers of glycidyl methacrylate, styrene, 2-ethylhexyl acrylate, which is modified with a dehydrated castor oil fatty acid.

18. The coating composition of claim 1 containing about 0.11 to about 200 percent by weight, based on the weight of the binder, of pigment.

* * * * *